Aug. 10, 1954

P. HALPERT 2,686,021

AIRCRAFT AUTOMATIC PILOT TURN CONTROL

Filed Sept. 10, 1948

2 Sheets-Sheet 1

INVENTOR
PERCY HALPERT
BY
his ATTORNEY

Aug. 10, 1954  P. HALPERT  2,686,021
AIRCRAFT AUTOMATIC PILOT TURN CONTROL
Filed Sept. 10, 1948  2 Sheets-Sheet 2

INVENTOR
PERCY HALPERT
BY
Herbert H. Thompson
his ATTORNEY

Patented Aug. 10, 1954

2,686,021

UNITED STATES PATENT OFFICE 2,686,021

AIRCRAFT AUTOMATIC PILOT TURN CONTROL

Percy Halpert, Hempstead, N. Y., assignor to The Sperry Corporation, Great Neck, N. Y., a corporation of Delaware Application September 10, 1948, Serial No. 48,669

19 Claims. (Cl. 244—77)

1

The present invention relates to automatic pilots for aircraft that are capable of turning about the vertical axis thereof and approximately retaining a constant or natural rate of turn for a constant banking angle and speed. In accordance with the invention, the improved automatic pilot functions so that the craft is permitted to assume a natural rate of turn depending on its aerodynamic properties and the turn rate is then coordinated or stabilized at that value. Heretofore, automatic pilots were effective to cause the craft to enter and continue a banked turn at an arbitrary rate and various ways were employed to maintain the rate of turn of the craft at the established arbitrary rate. As the arbitrary turn rate heretofore established by the automatic pilot very seldom coincided with the natural rate of turn of the craft for the given banking angle and speed, the turns produced were not smooth. The primary object of the present invention is to obviate this condition in the manner heretofore described so that the craft is controlled to provide as smooth a turn as possible.

The term natural rate of turn of the craft as herein employed is defined as the coordinated turn rate associated with a given bank angle and air speed of the craft. It is assumed here that such a rate of turn is brought about by the inherent directional stability of the craft with substantially zero side slip or skid when the rudder or other azimuth control is centralized in a steady state condition.

With the improved automatic pilot turn control, no adjustment for air speed is required as the system provides coordinated rate stabilized turns at all craft speeds. However, it is desirable that the speed of the craft for a given banked turn be maintained constant.

One of the features of the invention resides in the provision of a turn rate correcting means for the automatic pilot in the form of a follow-up system with a motor having sufficient inertia that the time required for the motor to change its speed is longer than the time for the craft to return to its natural rate of turn after it has departed from the same.

A further feature of the present invention is provided by the employment of a signal in accordance with the rate of roll of the craft for operating the rudder servomotor of the automatic pilot during turns of the craft about its vertical axis.

Figure 1:
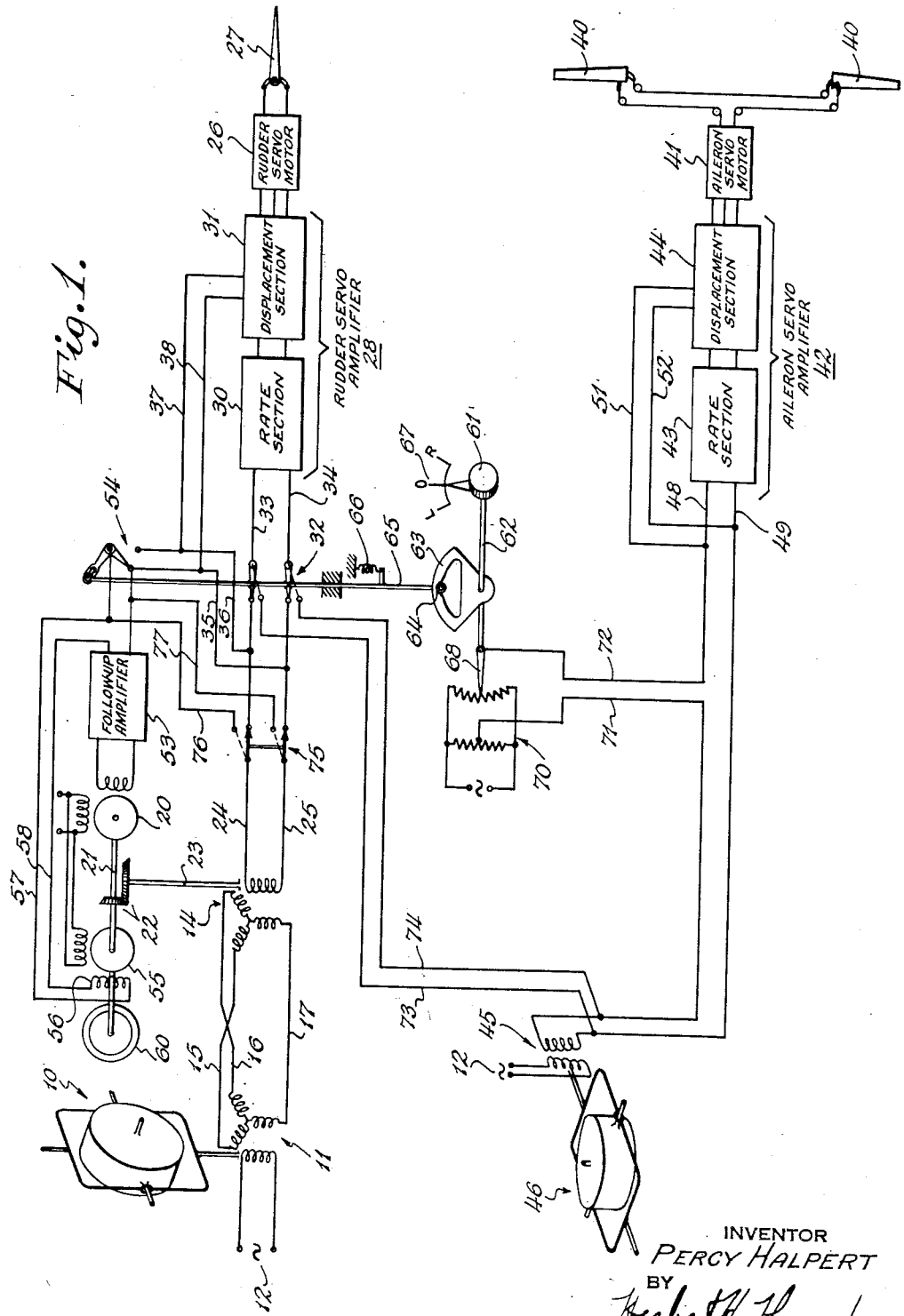
Figure 2:
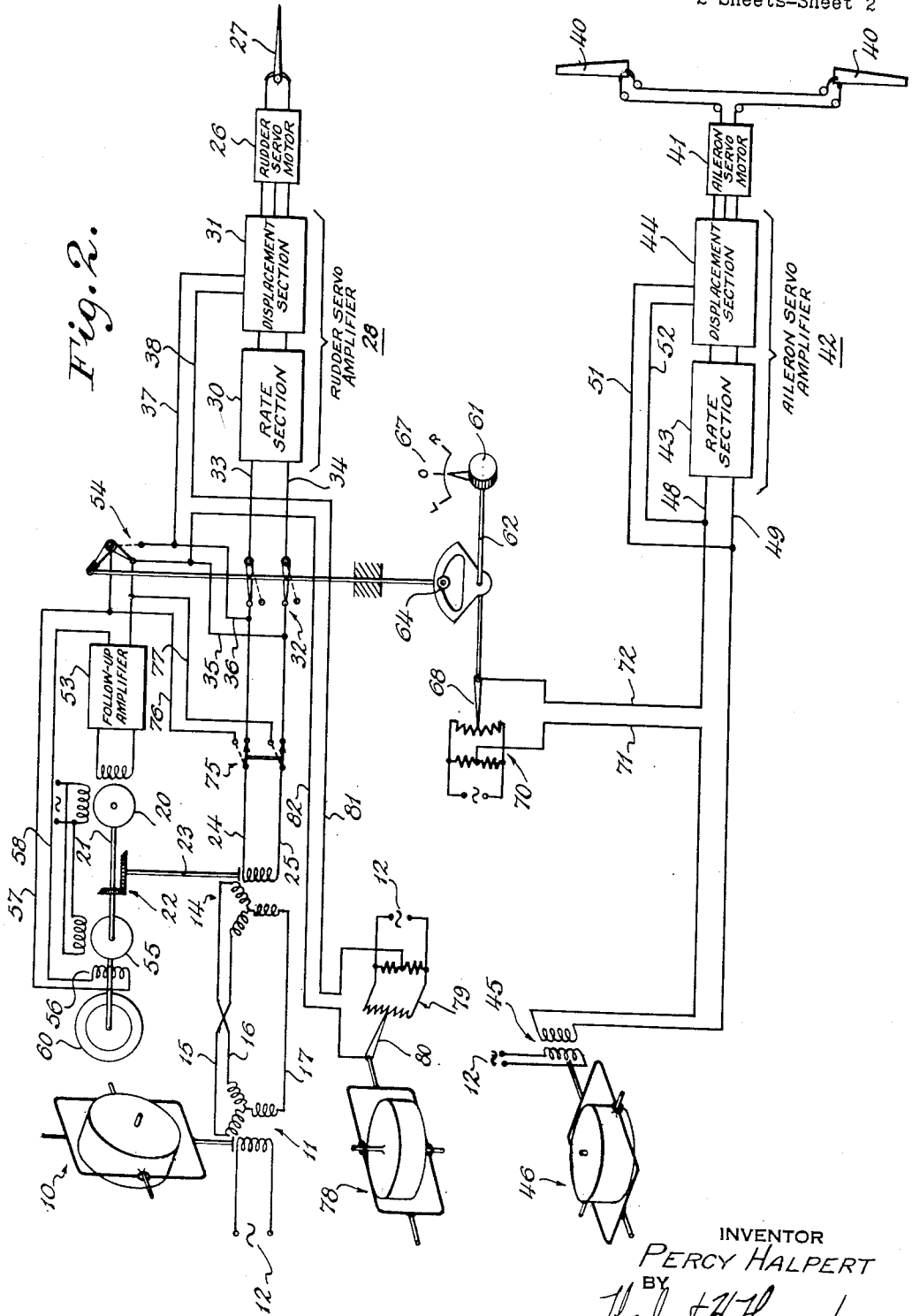

Other objects, features and structural details of the invention will be apparent from the following description when read in connection with the accompanying drawings wherein, Fig. 1 is a diagrammatic view and circuit diagram of an automatic pilot embodying the present inventive concepts, and Fig. 2 is a similar view showing a modified form of the invention.

With reference to the drawings, the improved automatic pilot is shown to include an azimuth reference or directional gyro indicated at 10. As shown, the vertical ring of the reference 10 positions the rotor of a selsyn device 11 fed by a suitable source of alternating current electrical energy generally indicated at 12. The stator of device 11 is fixed to the aircraft employing the improved automatic pilot. The output of device 11 is fed to a second selsyn device 14 by way of leads 15, 16 and 17. The rotor of device 14, as shown, is positioned by motive means or electrical motor 20 by way of shaft 21, reduction gearing 22 and shaft 23. The combined devices 11 and 14 provide a pair of interconnected pick-offs having the rotor part of one fixed to and rotatable with the azimuth reference device 10 and the rotor of the other connected to be operated by the motor 20, the stators of the pick-offs being secured to the craft. The pair of pick-offs or signal generators 11 and 14 together act as a single pick-off having one part positioned by gyro 10 and the other part positioned by the motor 20. In other words, the back-to-back selsyns 11 and 14 constitute a means for providing a signal corresponding to relative movement between the directional reference 10 and the follow-up motor 20 while the turn control of the present invention is in operation. The pair of pick-offs 11 and 14 provide a signal upon relative displacement of the respective rotor parts thereof from a position of agreement or null position.

In straight line flight of the craft, the pick-off 11 operates in a conventional manner, with the rotor of device 14 stationary, to provide a signal at leads 24 and 25 which varies in accordance with any deviation of the craft from a predetermined heading. This deviation is corrected by operation of the rudder servomotor of the automatic pilot, generally indicated at 26, which moves the rudder 27 of the craft to restore it to the desired heading. The signal at leads 24, 25 is fed the servomotor 26 by way of a conventional type of rudder servo amplifier 28 having a rate section 30 and a displacement section 31 such as that disclosed in my U. S. Patent 2,415,430 jointly with C. A. Frische and J. R. Wilkerson, issued February 11, 1947, and assigned to the assignee of the present application. As shown, the signal at leads 24, 25 is fed to the rate section 30 of the amplifier by way of double pole, double throw switch 32 and leads 33, 34. The input to the displacement section 31 is provided by way of leads 35, 36 and leads 37, 38. The output of amplifier 28 which combines both the rate and displacement signals of the respective sections 30, 31 operates the rudder servomotor 26 of the automatic pilot under straight line conditions of flight of the craft in a conventional manner.

The automatic pilot, as shown, also includes a conventional type of aileron control for the craft. The ailerons for the craft are indicated at 40 and the controls for the same include an aileron servomotor 41, an aileron servo amplifier 42 having rate and displacement sections 43, 44, respectively, similar to those used in connection with the rudder control of the craft. The signal inputs to sections 43, 44 are provided by the roll pick-off 45 of conventional form of a vertical reference such as a gyro vertical 46 fed thereto by way of the respective leads 48, 49 and 51, 52. A further signal supplied to the aileron amplifier 42 is a roll command signal which is produced by displacing the potentiometer 68 and thereby unbalancing the bridge 70, as will be hereinafter more fully described.

In accordance with the invention, the automatic pilot includes a normally ineffective follow up system providing means for making stabilized turns at the natural rate of turn of the craft for a given bank angle and air speed, the same including an amplifier 53 connected to leads 37, 38 by way of the normally open switch 54. With switch 54 in its closed position, i. e. thrown to the right, the amplifier 53 provides an output that energizes motor 20 to drive or move the rotor of selsyn device 14 in accordance with the signal at leads 24, 25. Motor 20 also drives a generator 55 which feeds back a signal to amplifier 53 by way of winding 56 and leads 57, 58 to make the rotational speed of the motor 20 of the motor-generator set proportional to the amplitude of the signal at leads 24, 25.

The follow-up amplifier 53 and motor-generator set cooperate to turn the rotor of selsyn device 14 at such a rate as to keep the signal at leads 24, 25 very nearly zero. The amplifier 53 advantageously has a very high gain so that the motor 20 will operate during turns on appearance of even a very small signal at leads 24, 25. As shown, the motive means or electric motor 20 of the follow-up system is operatively connected to a fly-wheel 60 on shaft 21 which tends to maintain the motor at a constant speed when the craft is yawing. The follow-up also includes, the interconnected pick-offs comprising selsyn devices 11 and 14 and the azimuth reference 10. The system is preferably overdamped by the signal provided by the winding 56 of the generator 55.

The improved automatic pilot includes means for causing the craft to bank and turn. Such means is provided by a turn knob 61 which through shaft 62 positions a cam piece 63 to move a cam follower 64 on rod 65 to simultaneously move switch 32 to its dotted line position in Fig. 1 and close switch 54 to render the follow-up system effective. Spring 66 normally positions the rod 65 so that the respective switches 32 and 54 are located in the full line positions thereof shown in Fig. 1. The turn knob 61 may be provided with a scale 67 fixed to the craft graduated in terms of rate of turn for a given air speed to the right and left of a zero position. When moved from zero position, the turn knob 61 also moves the arm 68 of one of a pair of potentiometers to unbalance an electrical bridge 70 and feed an input to the amplifier 42 by way of leads 71, 72. Until the bank signal from the bridge 70 is balanced by an equal and opposite signal from roll pick-off 45, the craft rolls about its fore and aft axis. When the balanced condition is reached the craft is at a predetermined bank angle for the turn. In accordance with the invention, as soon as the craft rolls and pick-off 45 produces an output signal, a portion of the signal is fed to the rate section 30 of the rudder servo amplifier 28 by way of leads 73, 74 switch 32 and leads 33, 34. In turns, the signal from the pick-off 14 at leads 24, 25 to the rate section 30 of the rudder servo amplifier is by-passed by the switch 32 which is then in its dotted line position in Fig. 1. This arrangement provides a means for providing a signal which varies in accordance with the rate of roll of the craft. The roll rate signal from the section 30 is then fed to the rudder servomotor 26 of the automatic pilot to cause the craft to turn about its vertical axis as the same moves to the desired banking angle. When the signal at 45 is equal and opposite to that of the bridge 70, the output at the rate section 30 of the rudder servo amplifier 28 becomes zero. A suitable position repeatback may be employed in a conventional manner to insure that the rudder will be returned to its centralized or streamline position when the output of the amplifier 28 is zero. Thus, the turn is initiated and will be maintained by the inherent directional stability of the craft until the turn knob 61 is returned to its detent position at which time the reverse of the above sequence of operation will occur.

At this time, the signal appearing at leads 24, 25 from the interconnected pick-offs provided by selsyn devices 11 and 14 is fed by way of leads 35, 36 to the amplifier 53 to drive the motive means 20 of the motor-generator set and is also fed to section 31 by way of leads 37, 38. However, the motor 20 turns the rotor of device 14 at a rate corresponding to the natural rate of turn of the craft and the signal at leads 24, 25 is reduced to substantially zero. The flywheel 60 in the system tends to maintain the speed of motor 20 constant and corresponding to the craft's natural rate of turn.

Sufficient inertia is given to the follow-up motor 20 by the addition of flywheel 60 to effect short period stability. Thus, should an outside disturbance or gust occur during the turn causing the rate of turn to change relatively rapidly, the follow-up including motor 20 will either lead or lag the craft sufficiently to cause a relatively large signal to appear across leads 24, 25 to section 31 of the rudder amplifier 28. This signal moves the rudder before the speed of motor 20 can change materially to restore the craft's turn rate to its natural rate of turn. The automatic pilot is accordingly effective during turns to correct the rate of turn of the craft when such rate departs from the natural turn rate.

If the craft departs from its natural turn rate very slowly, very little correcting signal would be fed to amplifier 31 for the follow-up would then have sufficient time to change its speed thus keeping the signal at 24, 25 substantially zero. If the craft departs from its natural turn rate rapidly, a large signal is fed to amplifier 31 as the inertia in the system provided by flywheel 60 prevents the follow-up motor 20 from changing its speed accordingly as it does not have sufficient time to do so. It will be understood, that the established speed of operation of motor 20 corresponds to the natural turn rate of the craft. The banked turn of the craft is properly coordinated for any air speed since in all cases the follow-up system will eventually reduce the signal at 24, 25 to substantially zero for a steady turn. The time for motor 20 of the follow-up system to change its speed is made longer than the time for the craft to return to its natural rate of turn. Motor 20 of the follow-up system provides a means for measuring the natural turn rate of the craft. The flywheel 60 for motor 20 provides a means for resisting change in the measurement provided by the motor.

If, during the turn, a gust or other disturbance should occur which increases or decreases the bank angle set in by control knob 61, a signal varying in accordance with the rate of change of bank angle will be supplied to the rudder servomotor to quickly apply rudder to counteract any tendency of the craft to turn as a result of the changed bank angle.

The automatic pilot may also include an off-on switch 75 which is effective when the device is in an off position to energize motor 20 by an input from amplifier 53 by way of leads 76, 77 to zeroize the signal at leads 24, 25 and properly position the rotor of device 14 so that the automatic pilot may be turned on by the operator at any time.

In the modification of the invention shown in Fig. 2, the rate of roll signal providing means for the improved automatic pilot is provided by a gyroscope 78 for measuring the rate of movement of the craft about its roll or fore and aft axis. The rate gyroscope 78 is operatively connected to a pick-off in the form of an electrical bridge 79 whose movable arm 80 is operated by the gyroscope. In this form of the invention, the bridge network 79 will feed a signal which varies in accordance with the rate of roll of the craft directly to the displacement section 31 of rudder servo amplifier 28 by way of leads 81 and 82, bypassing the rate section 30 of the rudder servo amplifier 28. As above, the signal corresponding to the roll rate of the craft will cause the yaw control surface to be displaced in an amount determined by the rate of roll of the craft. Therefore, upon commanding a roll or rate of turn, the craft will bank about its fore-and-aft axis and simultaneously yaw about its vertical axis. When the bank angle of the craft is established, the output of the bridge 79 becomes zero and, as above, the rudder is returned to its streamline position and the craft will continue to turn due to its inherent directional stability at a rate determined by the bank angle.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft capable of turning and approximately retaining a constant rate of turn at a constant banking angle, means for causing the craft to bank and turn at its natural rate of turn, a rudder servomotor, and means for operating said rudder servomotor to correct the rate of turn when such rate departs from the natural rate of turn of the craft comprising a follow up system including an azimuth reference, a pair of interconnected pick-offs having stator and rotor parts providing a signal upon relative displacement of the respective rotor parts from positional agreement, the rotor part of one of the pick-offs being fixed to said azimuth reference, motive means responsive to the signal of said pick-offs operatively connected to move the rotor part of the other of said pick-offs at a rate corresponding to the natural rate of turn of the craft, inertia means for said motive means whereby the time for the motive means to change its speed is made longer than the time required for the craft to return to its natural rate of turn after departure therefrom, and means operatively connecting said pair of pick-offs and the rudder servomotor.

2. An automatic pilot as claimed in claim 1, in which said pair of pick-offs provides an electrical signal, said motive means is an electric motor driven by the signal of said pair of pick-offs, and said inertia means is a flywheel driven by said motor tending to maintain the motor at a constant speed during turns.

3. An automatic pilot turn control for dirigible craft including a follow up system having motive means, means for operating said motive means during turns at a speed corresponding to the natural rate of turn of the craft, inertia means tending to maintain the speed of the motive means constant, means for measuring departure of the craft from its natural rate of turn responsive to said operating means, and means operated by said measuring means for restoring the craft to its natural rate of turn.

4. An automatic pilot turn control for dirigible craft including a follow up system having motive means operable during turns at a speed corresponding to the natural rate of turn of the craft, an inertial device driven by said motive means of such character that the time required for the motive means to change its speed is longer than the time required for the craft to return to its natural rate of turn after departure therefrom, and means operated by said motive means for restoring the craft to its natural turn rate.

5. An aircraft automatic pilot having a normally ineffective follow up system including an azimuth reference, a pair of interconnected pick-offs having stator and rotor parts providing a signal upon relative displacement of the respective rotor parts from positional agreement, the rotor part of one of the pick-offs being fixed to said azimuth reference, motive means responsive to the signal of said pick-offs for moving the rotor part of the other of said pick-offs at a speed corresponding to the natural rate of turn of the craft, inertia means for maintaining said motive means at a constant speed, means for causing the craft to bank to a fixed angle and turn at a rate corresponding to its natural rate of turn, means operated by said turn causing means for rendering said follow up system effective, and means operated by said pick off when the craft departs from its natural rate of turn for returning the craft to its natural rate of turn.

6. An aircraft automatic pilot having a rudder servomotor, an aileron servomotor, manually settable means for operating said aileron servomotor to cause the craft to roll to a predetermined bank angle, means for providing a signal in accordance with the rate of roll of the craft, means for operating said rudder servomotor by the signal of said rate of roll signal providing means to cause the craft to yaw; and second rudder servomotor operating means operable to maintain the craft at its natural rate of turn for the predetermined bank angle, comprising a follow up system including an azimuth reference, a pair of interconnected pick-offs having stator and rotor parts providing a signal upon relative displacement of the respective rotor parts from positional agreement, the rotor part of one of the pick-offs being fixed to the azimuth reference, motive means responsive to the signal of said pick-offs for moving the rotor part of the other of the pick-offs, and inertia means for resisting change in the speed of operation of said motive means.

7. An automatic pilot as claimed in claim 6, in which said rate of roll signal providing means includes a gyroscope measuring the rate of movement of the craft about its roll axis and a pick off operatively connected thereto.

8. An automatic pilot as claimed in claim 6, in which said rate of roll signal providing means includes a gyroscope providing a reference for the craft about its roll axis, a signal pick off operatively connected thereto, and means for providing a signal in accordance with the rate of change of the signal of the pick off connected to the gyroscope.

9. An aircraft automatic pilot turn control, means for banking said craft to a predetermined bank angle whereby to cause said craft to turn at a rate corresponding to the rate of turn established by said bank angle, reference means including a signal generating means for providing a signal corresponding to the reference rate of turn of said craft in space as established by said bank angle, a follow-up servo loop comprising a servomotor responsive to said reference signal and adapted to be driven at a speed corresponding to the reference rate of turn of said craft, inertia means coupled with said follow-up servomotor tending to maintain the speed thereof in correspondence with the then pre-existing rate of turn upon transient changes in the rate of turn as reflected by said reference means, a second servo loop comprising a servomotor responsive to said rate of turn reference signal and adapted to control the rate of turn of said craft, the response of said follow-up servo loop to said reference signal being relatively slow as compared with the response of said second servo loop to said reference signal whereby short-period changes in the rate of turn of said craft will be corrected by said second servo loop before an appreciable change in speed of said follow-up servo loop can occur.

10. An aircraft automatic pilot turn control, a rudder servomotor and control means therefor, an aileron servomotor, settable means connected to operate said aileron servomotor whereby to cause the craft to roll to a predetermined bank angle, means for providing a signal which varies in accordance with the rate of roll of said craft, and means connected to be operated simultaneously with said settable means for rendering said rate of roll signal effective to control said rudder servomotor control means.

11. In an aircraft automatic pilot turn control, a rudder servomotor and control means therefor, turn control means operable to cause said craft to roll to a predetermined bank angle, means for providing a signal which varies in accordance with the rate of roll of the craft, and means simultaneously operable with said turn control means for rendering said rate of roll signal effective to control said rudder servomotor control means.

12. In an aircraft automatic pilot, a rudder and rudder servomotor, control means for said servomotor, a roll attitude reference device for providing a signal which varies in accordance with the displacement of said craft in roll from a predetermined roll attitude, means for differentiating said displacement signal, and means for supplying the resultant signal to said rudder servomotor control means whereby to displace said rudder in an amount corresponding to the rate of roll of the craft.

13. In an aircraft automatic pilot, a rudder and rudder servomotor, control means for said servomotor, a rate of roll gyro including signal generating means for providing a signal which varies in accordance with the rate of roll of said craft, and means for supplying said rate of roll signal to said rudder servomotor control means whereby to displace said rudder in an amount corresponding to the rate of roll of the aircraft.

14. In an aircraft automatic pilot turn control, a rudder servomotor and control means therefor, an aileron servomotor and control means therefor, a yaw reference for supplying yaw control signals to said rudder servomotor control means, turn command means for supplying roll command signals to said aileron servomotor control means whereby to cause said craft to roll to a predetermined bank angle, means for providing a signal which varies in accordance with the rate of roll of said craft, and means actuated by said turn command means for rendering said yaw reference ineffective and for supplying said rate of roll signal to said yaw servomotor control means during command turns whereby to control the rudder during said command turns in an amount dependent upon the rate of roll of said craft.

15. An aircraft automatic pilot turn control including roll and yaw control surfaces, roll and yaw servomotors for actuating said surfaces, roll and yaw servomotor control means, and a roll reference device, a turn command control comprising settable means coupled with said roll reference for providing a roll displacement signal, means for supplying said roll displacement signal to said roll servomotor control means whereby to roll said craft to a predetermined bank angle through said roll control surfaces, means for providing a signal which varies in accordance with the rate of roll of said craft, and means for supplying said roll rate signal to said yaw servomotor control means whereby to displace said yaw control surface in an amount dependent upon the rate of roll of said craft.

16. An aircraft automatic pilot turn control including roll and yaw control surfaces, roll and yaw servomotors for actuating said surfaces, means for controlling said servomotors, and a roll reference device, a turn command control comprising settable means coupled with said roll reference for providing a roll displacement signal, means for supplying said roll displacement signal to said roll servomotor control means whereby to roll said craft to a predetermined bank angle through said roll control surfaces, means for providing a signal which varies in accordance with the rate of roll of said craft, and means actuated by said settable means for supplying said roll rate signal to said yaw servomotor control means whereby to displace said yaw control surface in an amount dependent upon the rate of roll of said craft.

17. An aircraft automatic pilot turn control including roll and yaw servomotors and control means for operating said servomotors, a roll reference device, a turn command control comprising settable means coupled with said roll reference for providing a roll displacement signal, means for supplying said roll displacement signal to said roll servomotor control means whereby to roll said craft to a predetermined bank angle, means actuated by said settable means for supplying said roll displacement signal to said yaw servomotor control means, said yaw servomotor control means including means for deriving from said roll displacement signal a derivative signal varying in accordance with the rate of change of said roll displacement signal and said yaw servomotor being controlled by said derivative signal only.

18. An aircraft automatic pilot turn control including roll and yaw control surfaces, roll and yaw servomotors for actuating said surfaces, control means for said servomotors, and a roll reference device, a turn command control means coupled with said roll reference device for providing a roll displacement signal, means for supplying said roll displacement signal to said roll servomotor control means whereby to roll said craft to a predetermined bank angle through said roll control surfaces, a rate of roll gyroscope including means for providing a signal which varies in accordance with the rate of roll of said craft, and means actuated by said settable means for supplying said roll rate signal to said yaw servomotor control means.

19. An aircraft automatic pilot turn control including roll and yaw servomotors, control means for said servomotors, a roll reference, turn command means coupled with said roll reference for supplying a signal to said roll servomotor whereby to roll said craft to a predetermined bank angle, means for providing a signal which varies in accordance with the rate of roll of said craft, first switch means actuated by said turn command means for supplying said rate of roll signal to said yaw servomotor control means whereby to cause said craft to turn simultaneously with rolling thereof, a directional reference for providing a signal corresponding to the displacement of said craft from a predetermined yaw attitude, motive means coupled with said directional reference, and second switch means actuated simultaneously with said first switch means for supplying said yaw displacement signal to said motive means whereby to effectively rotate said directional reference at a rate corresponding to the rate of turn of said craft.

References Cited in the file of this patent

UNITED STATES PATENTS

| Number | Name | Date |
|---|---|---|
| 2,115,086 | Riggs | Apr. 26, 1938 |
| 2,162,862 | Protzen | June 20, 1939 |
| 2,190,390 | Thiry | Feb. 13, 1940 |
| 2,238,300 | Zand et al. | Apr. 15, 1941 |
| 2,270,875 | Hanson et al. | Jan. 27, 1942 |
| 2,429,642 | Newton | Oct. 28, 1947 |
| 2,454,980 | Sobell | Nov. 30, 1948 |
| 2,464,629 | Young | Mar. 15, 1949 |
| 2,480,634 | Dawson | Aug. 30, 1949 |
| 2,510,133 | Nissen | June 6, 1950 |
| 2,611,559 | Meredith | Sept. 23, 1952 |